United States Patent [19]

Pierce, Jr.

[11] 4,179,099

[45] Dec. 18, 1979

[54] EXPANDING GATE VALVE

[75] Inventor: Elwood K. Pierce, Jr., Coldspring, Tex.

[73] Assignee: Petroleum Designers, Inc., Houston, Tex.

[21] Appl. No.: 921,460

[22] Filed: Jul. 3, 1978

[51] Int. Cl.² .............................................. F16K 25/00
[52] U.S. Cl. .................................... 251/168; 251/196; 251/202
[58] Field of Search ................ 251/167, 168, 196, 202

[56] References Cited

U.S. PATENT DOCUMENTS

| | | | |
|---|---|---|---|
| 3,349,789 | 10/1967 | Crain | 251/196 X |
| 3,431,692 | 3/1969 | Tillman | 251/202 |
| 3,768,774 | 10/1973 | Baugh | 251/196 X |

FOREIGN PATENT DOCUMENTS 1213840  4/1960  France ..................... 251/202

Primary Examiner—Harold W. Weakley

[57] ABSTRACT

An expanding gate valve according to the present invention includes a gate system incorporating a pair of segments, one segment being formed to define opening cam surface means and the other segment being formed to define closed cam surface means. Spreader means is positioned in stationary manner within the valve chamber of the valve and includes opening and closing cam surface means that is engageable respectively with the cam surface means of the segments to achieve wedging, mechanically energized sealing enhancement between the segments and the valve seats as the gate segments reach the open or closed positions thereof during operation. The body structure of the valve is formed to define a valve chamber of generally cylindrical configuration within which may be located a pair of partially cylindrical seat carrier elements that properly position a pair of seat rings in relation to the valve body and the planar sealing surfaces of the gate segments. The valve mechanism also includes a back seating system capable of establishing both a metal-to-metal seal and a deformed seal between a tapered seat formed in the bonnet and a tapered seal structure carried by a gate drive element.

16 Claims, 11 Drawing Figures

4,179,099

EXPANDING GATE VALVE

FIELD OF THE INVENTION

This invention relates generally to gate valves and more particularly to gate valves incorporating mechanical means for causing mechanical gate expansion to enhance the sealing ability of a valve mechanism. More particularly, the invention is directed to an expanding type gate valve incorporating a segmented gate structure and further incorporating a gate spreader mechanism that is capable of achieving expansion of the gate structure at both the open and closed positions thereof. The invention also concerns utilization of a back-face seal system to develop a seal between the valve stem and the bonnet under certain desirable conditions.

BACKGROUND OF THE INVENTION

In the petroleum industry, especially in conjunction with well production and pipeline transportation of petroleum products, the most widely used valves are gate valves. Typically, gate valves fall into two basic categories, i.e. those valves incorporating slab-type gates and valves having expanding gates. In many cases, it is desirable to provide means for enhancing the sealing ability of a valve through utilization of some motive force. In some cases, the pressure of the fluid controlled by the valve can be used for seal enhancement. In the case of slab-type gate valves, the seat assemblies may be energized by the pressure of the fluid medium controlled by the valve. In other cases, enhancement of the sealing ability of a valve may take the form of hydraulic or pneumatic actuating means or any one of a number of suitable mechanisms for mechanically increasing the engagement force between the seats and the gate structure of a valve mechanism.

Expanding type gate mechanisms have been widely used in the petroleum industry in both wellhead and pipeline valves. In some cases problems develop because of the inability of an expanding gate mechanism to remain centralized during movement between the open and closed positions thereof. The high pressure to which these valves may be subjected causes the downstream segment of the expanding gate mechanism to float or be urged downstream where pressure induced sealing is accomplished between the downstream gate segment and the downstream seal. Movement of the gate under these conditions can develop excessive friction that might cause excessive erosion or galling of the gate or seats during operation. It is desirable to provide means for centralizing the gate mechanism during operation.

In many cases it is desirable to provide means for retaining valve seats within a valve body and to insure ease of removing the valve seats for repair or replacement. In many cases the valve seats can become corroded and eroded to the point that the valve body structure itself may be severely damaged by seat removal.

A most desirable feature in gate valves is the desirability of providing a valve structure that minimizes pressure drop as fluid flows through the valve. Where the flow passage extending through the valve body, valve seats and gate assembly remains of substantially identical diameter, the valve may be referred to as a through conduit type gate valve having essentially the same pressure drop as an equal length of identical diameter pipe. It is important when utilizing an expanding type gate system that the attributes of through conduit type gate valves be maintained.

In many cases it may be desirable to replace or repair valve stem thrust bearings and packing systems without shutting down the flow line controlled by the valve. Back-face seating type sealing systems have been developed and utilized in the past for establishing a seal between the bonnet structure of the valve and the valve stem. Since metal-to-metal type seals are difficult to establish and maintain, it is desirable to provide a back-face sealing system having means for insuring seal integrity and reliability so that such repair operations can be carried out without any sacrifice from the standpoint of safety.

It is a feature of the present invention to provide a novel expanding gate valve system incorporating an expanding gate that is capable of expanding at both the open and closed positions thereof to enhance sealing ability of the valve mechanism.

It is another feature of the present invention to provide a novel expanding gate valve mechanism incorporating an expanding gate and gate centralizer system that centralizes the position of the gate at all times.

Another important feature of the present invention involves the provision of a novel expanding gate valve mechanism that insures accurate positioning of the gate port relative to the flow passages of the valve, thus insuring optimum fluid handling characteristics.

It is also a feature of the present invention to provide a novel expanding gate valve mechanism that is of the through conduit type, offering no more resistance to flow than an equal length of equal diameter conduit.

Among the several objects of the present invention is noted the contemplation of a novel expanding gate valve mechanism incorporating partially cylindrical seat carrier elements located within a generally cylindrical valve chamber and which support floating seat elements within the valve chamber.

It is also a feature of the present invention to provide a novel expanding gate valve mechanism including seat and seat carrier assemblies that are easily and quickly removable and replaceable.

It is another feature of the present invention to provide a novel expanding gate valve mechanism incorporating a back seat system utilizing the combination sealing ability of a metal-to-metal seat and a deformable seat element to achieve sealing between the bonnet and valve actuator mechanism when desirable for replacement of thrust bearings and packing assembly structure of the valve mechanism.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

An expanding type gate valve mechanism according to the present invention includes a valve body structure that is formed to define a generally cylindrical valve chamber that is intersected by inlet and outlet flow passages. Seat recesses are formed in the valve body about each of the flow passages and receive annular seat rings that are supported in part by partially cylindrical seat carrier elements that interfit in mating relation within the valve chamber. The seat carrier elements define generally planar opposing surfaces between which are received a segmented gate and spreader assembly incorporating a pair of segments having planar sealing surfaces that are positioned in supporting relation with the planar gate support surfaces of the seat carrier elements.

One of the gate segments is formed to define opening cam surfaces while the other segment defines closing cam surfaces. A spreader element is supported in fixed relation within the valve chamber and includes opening and closing cam surfaces that are positioned for selective engagement with the opening and closing cam surfaces of the gate segments. The cam surfaces of the spreader interact with the cam surfaces of the gate segments to cause expansion of the gate assembly as the gate assembly reaches the open and closed positions thereof during operation. The segmented gate assembly is allowed to contract as gate movement between the open and closed positions is initiated, thus insuring ease of travel between the open and closed positions.

The segmented gate and gate spreader mechanism incorporates a centralizer system to insure optimum positioning of the gate during its travel between the open and closed positions thereof and further insures centralization of the segmented gate structure at both the open and closed positions.

The bonnet structure of the valve mechanism is formed to define an internal tapered seat surface and an elongated stem and gate actuator element is formed to define an external tapered shoulder in which is retained an annular sealing element. The tapered back-face seating surface and tapered shoulder are of differing angles of taper thereby causing metal-to-metal contact between these tapered surfaces to occur in the manner of annular line contact and developing an annular space that diverges in the upstream direction. The annular sealing element is positioned such that it engages the annular tapered seat surface prior to the establishment of metal-to-metal sealing contact between the tapered surfaces. The annular sealing element is deformed so as to develop higher compression at the downstream portion thereof as opposed to the upstream portion. The annular sealing element thus becomes pressure actuatable to enhance the sealing ability of the mechanical seal that is developed.

BRIEF DESCRIPTION OF PREFERRED EMBODIMENT

The manner by which the above recited features, advantages and objects of the present invention, as well as others which will become apparent, are attained can be understood in detail from a following more particular description of a preferred apparatus embodying the invention. The preferred embodiments are illustrated in the appended drawings, which drawings form a part of this specification.

IN THE DRAWINGS

DETAILED DESCRIPTION OF PREFERRED EMBODIMENT

Figure 1:
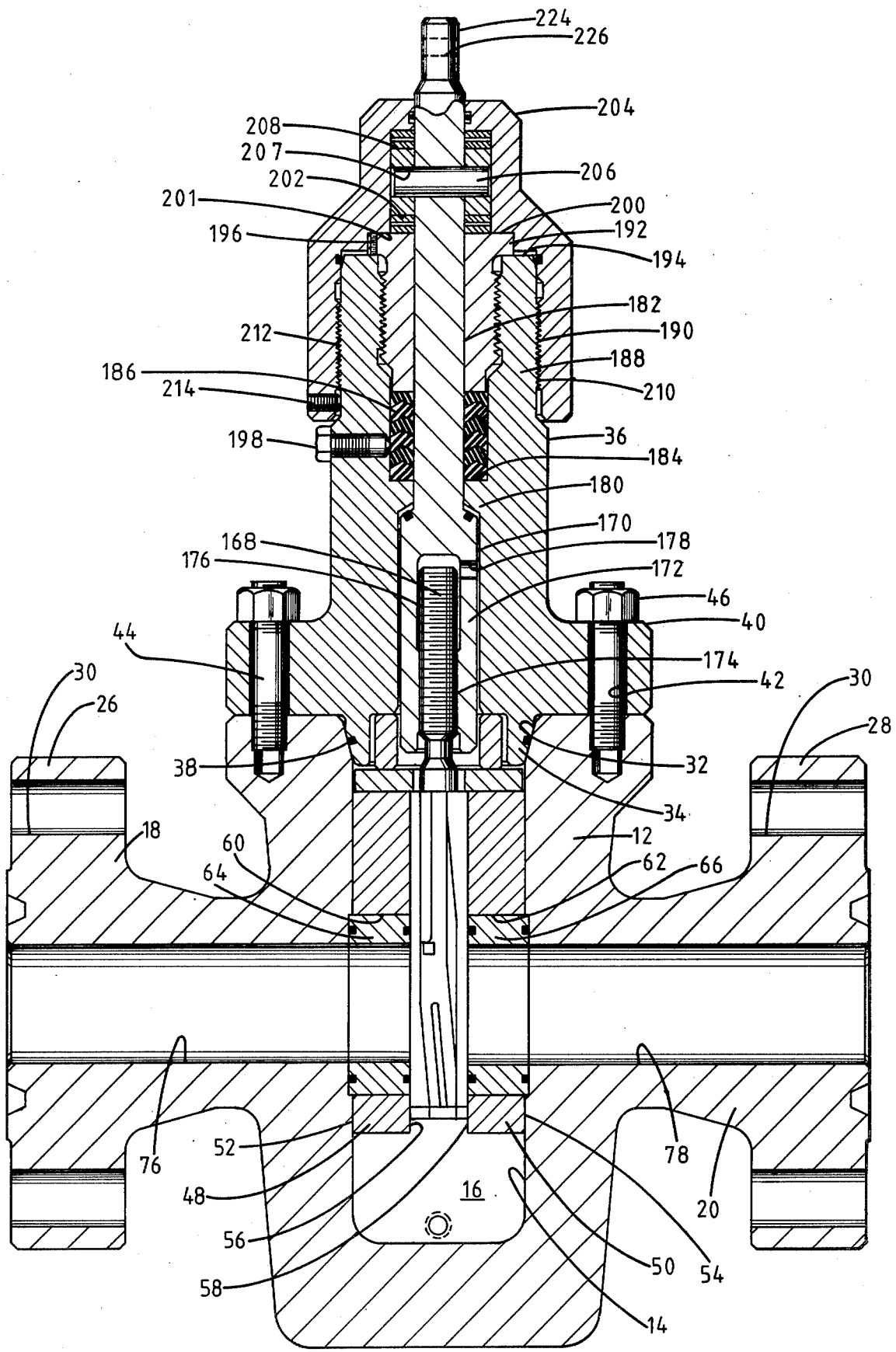
FIG. 1 is a sectional view of an expanding type gate valve constructed in accordance with the present invention and representing the preferred embodiment.

Referring now to the drawings and first to FIG. 1, the expanding gate valve mechanism of the present invention is generally illustrated at 10 and includes a valve body structure 12 that is formed internally to define a generally cylindrical wall 14 defining a generally cylindrical valve chamber 16. The valve body structure 12 may be defined by an integral casing that also includes connection flanges if desired. In accordance with FIG. 1, a pair of flange connections 18 and 20 are shown to be connected to the valve body 12 by welding as at 22 and 24, respectively. The flange connections 18 and 20 are shown to define connection flanges 26 and 28 having a plurality of apertures 30 formed therein through which bolts or studs may extend for bolted connection of the valve mechanism to a flanged flow line. Obviously, the flange connections 18 and 20 may be formed to define connection structure that may be connected to a flow line by welded or threaded connection if desired.

The upper portion of the valve chamber may be defined by an annular tapered surfaced 32, within which may be received an externally tapered sealing portion 34 of a bonnet structure 36. An annular bonnet sealing element 38 is retained within an annular groove formed in the sealing portion of the bonnet and engages the tapered sealing surface 32 to establish sealing engagement therewith upon assembly of the bonnet structure to the valve body. The bonnet also includes a bonnet flange 40 having a plurality of apertures 42 formed therein through which threaded studs 44 may extend for retention of the bonnet in assembly with the valve body by means of a plurality of nuts 46. The taper of the sealing portion 34 of the bonnet and the sealing surface 32 of the valve body may be slightly different, thereby causing the tapered sealing portion 34 of the bonnet to become flexed by a camming action between the tapered surfaces as the bonnet flange is forced into tight engagement with the upper portion of the valve body when the nuts 46 are tightened. Mechanical flexing of the sealing portion 34 of the bonnet develops a metal-to-metal seal that is enhanced by the sealing ability of the bonnet seal 38.

Figure 8:
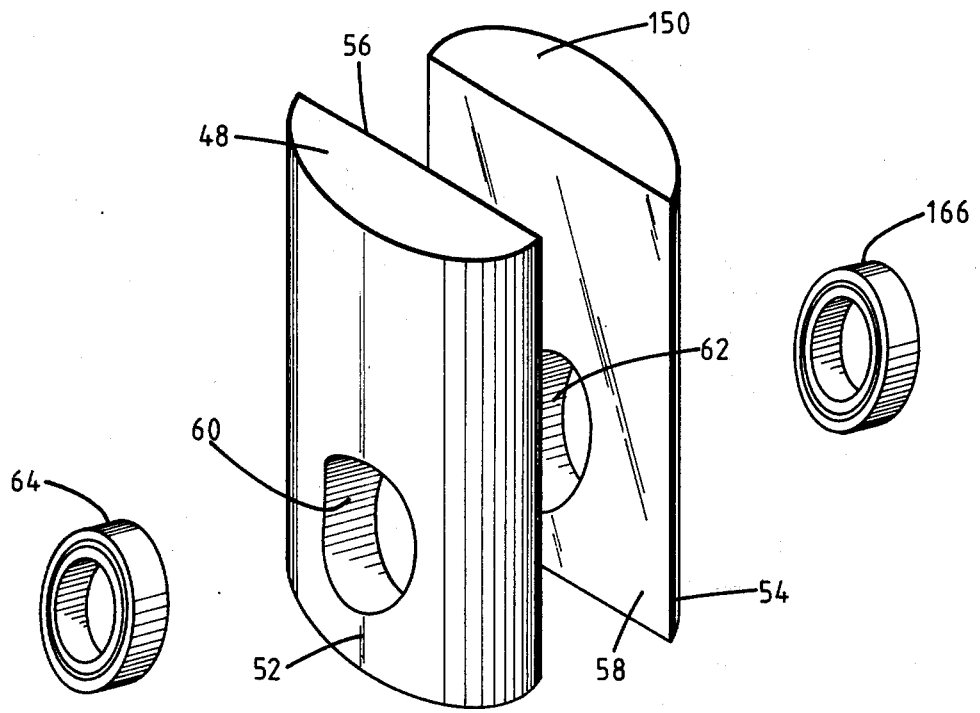
FIG. 8 is an exploded isometric view illustrating the seat assemblies, including seat rings and seat carrier elements of the valve mechanism of FIGS. 1 and 2.

Within the valve chamber 16 may also be positioned a pair of seat carrier elements 48 and 50 that are formed to define partially cylindrical outer surfaces 52 and 54, respectively, that have mating relation with the cylindrical wall 14 of the valve chamber. The seat carrier elements also define generally planar gate support surfaces 56 and 58 that are located in generally parallel relation within the valve body. As shown in the isometric exploded view of FIG. 8 and also in FIGS. 1 and 2, the seat carrier elements 48 and 50 are each formed to define openings 60 and 62 of generally circular cross-sectional configuration. A pair of seat rings 64 and 66 are positioned within respective ones of the openings 60 and 62 for support of the seat rings within the valve chamber 16. The seat rings 64 and 66 are of the floating type to facilitate retention of the seat rings in assembly with the seat carrier elements 48 and 50 and to provide for ease and simplicity of replacement when repair is necessary.

Figure 2:
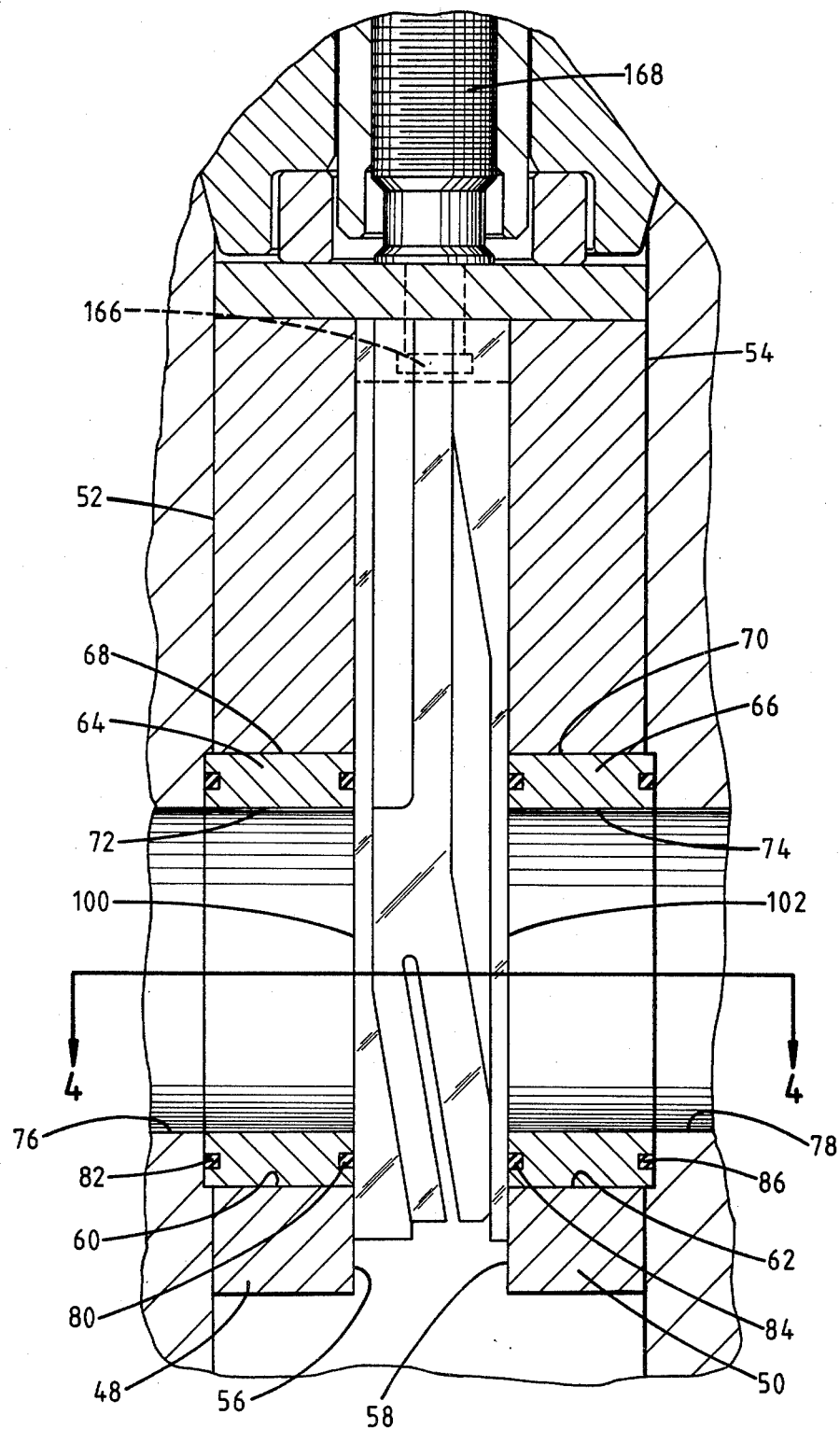
FIG. 2 is a fragmentary sectional view of the valve mechanism of FIG. 1 illustrating the expanding gate and seat assembly thereof in detail.

Referring now to FIG. 2 which illustrates the expanding gate system and the seat and seat carrier assemblies in detail, the seat elements 64 and 66 are formed to define generally cylindrical external surfaces 68 and 70 that have a sliding fitted relationship within respective seat carrier openings 60 and 62. The seats also define internal passages 72 and 74 that are positioned in registry with inlet and outlet flow passages 76 and 78 that are defined in the valve body 12 in intersecting relation with the valve chamber 16.

Each of the sealing elements 64 and 66 is formed to define annular face seal grooves 80 at one axial extremity thereof and an annular back face seal groove 82 at the opposite axial extremity. An annular face sealing element 84 is retained within each of the face seal grooves while annular back face sealing elements 86 are retained within respective ones of the back face seal grooves 82.

Figure 4:
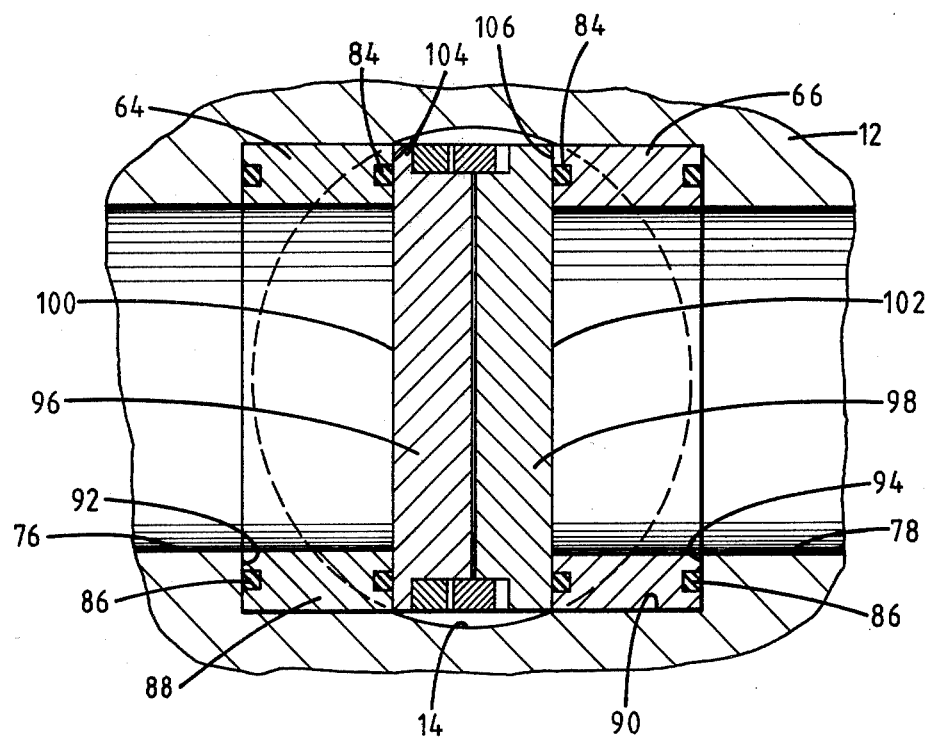
FIG. 4 is a sectional view taken along line 4—4 of FIG. 2 and illustrating the gate, gate spreader system, seat assemblies and seat carrier elements.

As is evident particularly with respect to the fragmentary sectional view illustrated in FIG. 4, the valve body 12 may be formed internally to define generally cylindrical internal seat recesses 88 and 90 defining circular generally planar backface shoulder surfaces 92 and 94. The back face sealing elements 86 establish sealing engagement with the shoulder surfaces 92 and 94 and this sealing ability is enhanced by a metal-to-metal seal between the seat rings and the shoulder surfaces when the gate mechanism of the valve is expanded under high mechanical load.

A pair of gate segment elements 96 and 98 are interposed between the planar gate support surfaces 56 and 58 of the seat carrier elements and define generally planar sealing surfaces 100 and 102 that are positioned, respectively, for engagement with the gate support surfaces 56 and 58. Sealing surfaces 100 and 102 are also interposed between the sealing face portions 104 and 106 of the seat rings 64 and 66. The face sealing rings 84 engage and estalbish sealing engagement with sealing surfaces 100 and 102 for establishment of a fluid tight seal. The sealing ability of sealing elements 84 may be enhanced by metal-to-metal sealing contact that is established under high mechanical load achieved through expansion of gate segments in the manner to be discussed hereinbelow.

Figure 3:
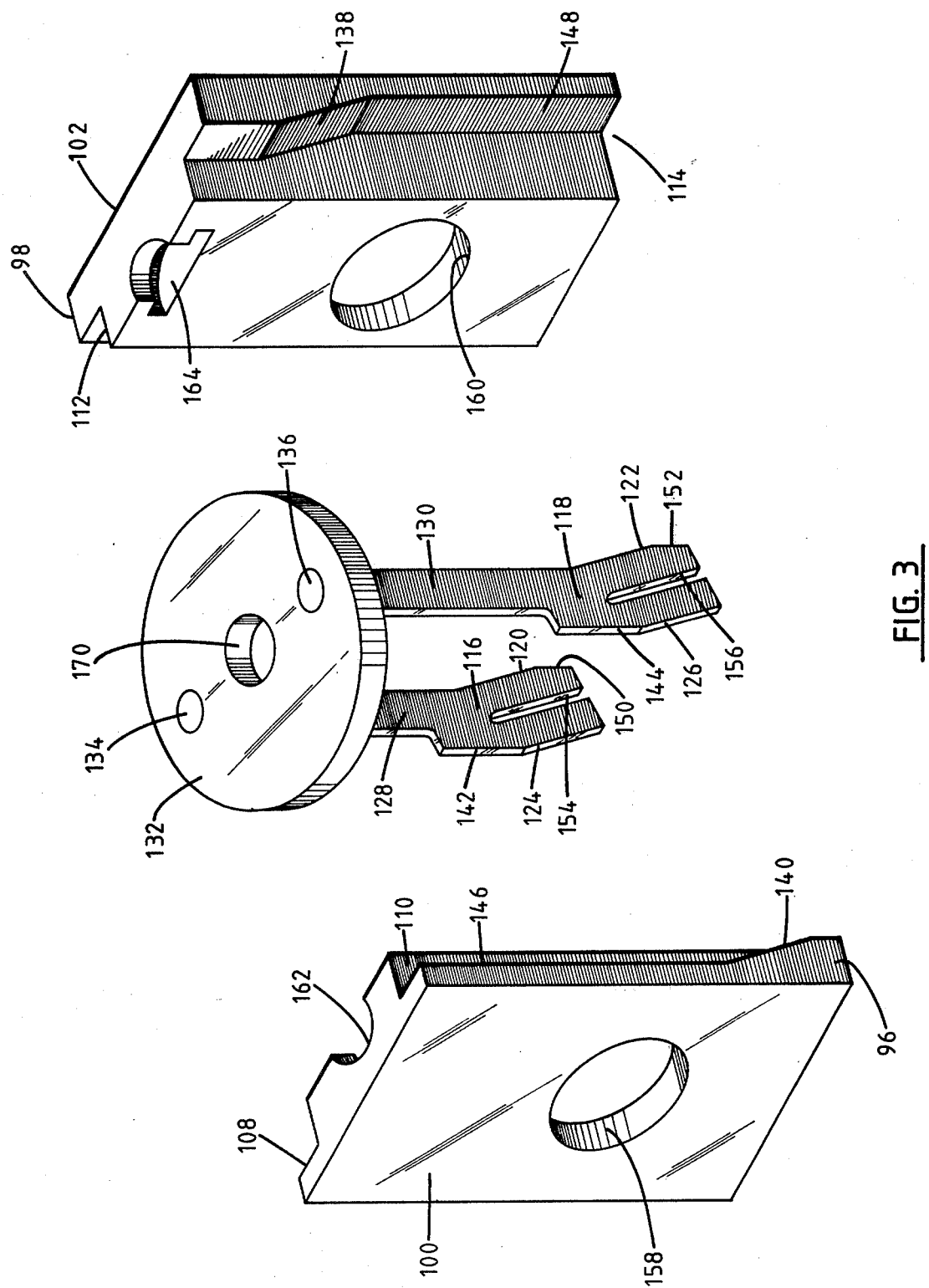
FIG. 3 is an isometric exploded view of the segmented gate and gate spreader mechanism of FIGS. 1 and 2.

Referring now to FIGS. 2, 3 and 4, the side edges of each of the gate segments are machined so as to define elongated recesses 108, 110, 112 and 114 that cooperate when the segments 96 and 98 are in assembly to define elongated slots extending the entire length of the gate segments. Within these elongated slots are positioned a pair of spreader elements 116 and 118 that define opening cam surfaces 120 and 122 and closing cam surfaces 124 and 126. The spreader elements 116 and 118 also include elongated support leg portions 128 and 130 that are secured in any suitable manner to a generally circular centralizer plate 132. One suitable form of connection between the leg portions 128 and 30 of the spreader elements may be accomplished by inserting the leg portions into respective apertures 134 and 136 of the plate 132 and by welding the leg portions to the plate by depositing weld metal within the apertures.

The elongated edge recesses defined along the edges of each of the segments define opening cam surfaces, one of which being shown at 138 and closing cam surfaces, one being shown at 140. The opening cam surfaces 138 of one of the segments are positioned for engagement with opening cam surfaces 120 and 122 of the spreader elements 116 and 118. With the spreader elements being positioned in stationary manner within the valve chamber, downward movement of the segments causes camming engagement between the opening cam surfaces 138 of segment 98 while parallel guide surfaces 142 and 144 maintain guiding engagement with an elongated guide surface 146 defined on segment 96. The camming action between opening cam surfaces 138 of the segment 98 and the opening cam surfaces 120 and 122 of the spreader elements causes the segments 96 and 98 to be moved apart, thus causing the sealing surfaces 100 and 102 of the segments to be forced toward tight engagement with respective ones of the seat elements 64 and 66. Conversely, as the gate segment elements 96 and 98 are moved toward the upward or closed position, guiding engagement will be maintained between guide surfaces 148 defined by the segment 98 and cooperating guide surfaces 150 and 152 defined respectively on the spreader elements 116 and 118. As the segment elements 96 and 98 reach the upper extent of travel, engagement between closing cam surfaces 140 of the segment 98 and cam surfaces 124 and 126 of the spreader elements will be established. Further upward movement will cause camming engagement thus resulting in expansion movement of the segments, again causing tight sealing engagement to be established between the sealing faces 100 and 102 of the segments and the respective seat elements 64 and 66. Thus, it is apparent that expansion of the gate segments will occur as the segments reach both the open and closed positions during gate travel and insuring mechanically enhanced sealing at both the open and closed positions.

Each of the spreader elements 116 and 118 is formed to define elongated slots 154 and 156 that extend in substantially parallel relation with the parallel cam surfaces of the spreader elements. The elongated slots 154 and 156 divide the spreader elements to form a bifurcated structure and facilitates flexing of the spreader elements as mechanical camming loads occur between the spreader elements and the gate segments. This feature prevents camming forces from becoming excessively high and insures accurate positioning of the gate segments at both the open and closed positions of the valve mechanism. Accurate positioning of the segment elements is especially important in the open position of the valve mechanism because the ports 158 and 160 of the segments must be precisely oriented with respect to the openings 72 and 74 defined by the valve seats in order to insure through conduit type flow conditions in the open position of the valve. The spreader elements 116 and 118 may be composed of any suitable material having resilient characteristics. For example, spring steel may be utilized to form the spreader elements.

Figure 5:
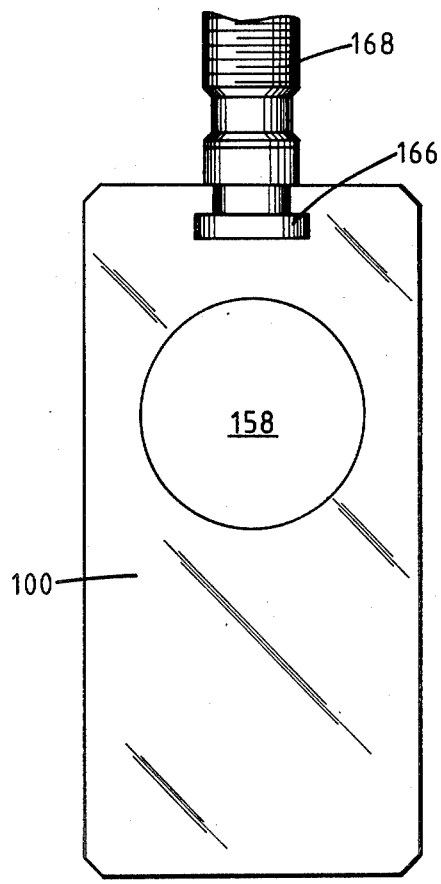
FIG. 5 is an elevational view of one of the gate segments of the valve structure of FIGS. 1-4.
Figure 6:
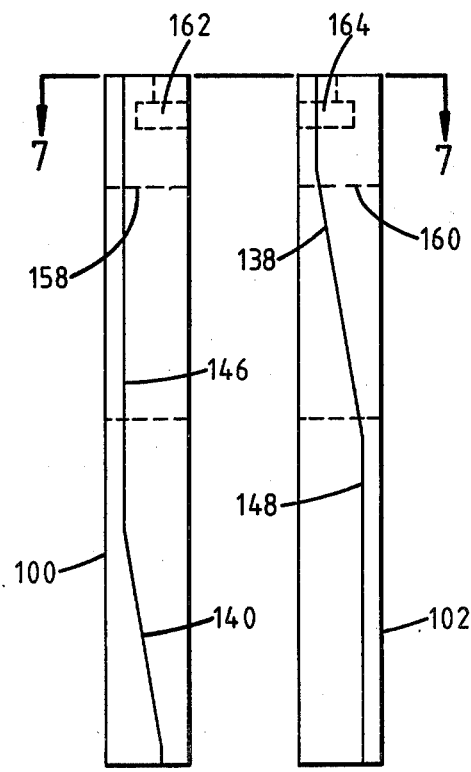
FIG. 6 is a side elevational view illustrating a pair of gate segments in spaced apart relation and illustrating the cam surfaces thereof in detail with the port and stem connection structure thereof illustrated in broken line.
Figure 7:
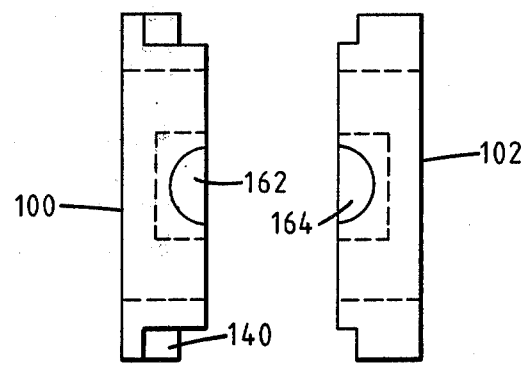
FIG. 7 is a plan view taken along lines 7—7 of FIG. 6 and illustrating the upper extremities of the gate segments of FIG. 6, with the ports and stem connection structure being illustrated in broken line.

The upper extremities of each of the segment elements 96 and 98 may be formed to define stem connection recesses 162 and 164 that are adapted, when the segments are in assembly, to establish connection with a connecting portion 166 of a valve stem element 168 in the manner illustrated in FIG. 5. The valve stem element 168 extends through an aperture 170 defined in the centralizer plate 132. As the gate segments 96 and 98 are moved to the closed position thereof, the upper surfaces of the segments will engage the lower surface of the centralizer plate 132. The centralizer plate thus forms a stop to limit upward movement of the gate.

The bonnet structure 36 may be formed to define an internal bore 170 within which is received a stem drive element 172 having an internally threaded portion 174 having threaded engagement with the external threads 176 of the valve stem 168. An aperture 178 is formed through the wall structure of the stem drive element 172 to allow fluid interchange within the internal partially threaded bore 174, thus preventing any hydraulic locking or fluid interference with reciprocation of the valve stem 168 relative to the stem drive element.

The passage extending through the bonnet structure 36 is formed to define an internal restricted portion 180 through which extends a reduced diameter portion 182 of the stem drive element 172. The annular restricted portion 180 defines a packing support shoulder 184 against which is retained a packing assembly 186 by means of an externally threaded packing retainer 188 that is received by internal threads 190 defined within the upper extremity of the bonnet. The packing retainer or gland 188 is formed to define an annular flange 192 that engages an upper surface 194 of the bonnet when the packing retainer is fully engaged within the internally threaded portion of the bonnet. The packing retainer is restrained against inadvertent rotation relative to the bonnet structure by means of a set screw 196 or any other suitable locking mechanism. A lubricant fitting 198 may be connected within an internally threaded passage formed in the bonnet structure having communication with the packing chamber. Sealant material, such as a semi-solid plastic material, may be injected through the lubricant passage into the packing chamber for revitalization of the packing assembly 186 in the event the packing assembly should become worn to the point that leakage might occur.

The packing retainer flane 192 is formed to define a bearing support surface 200 providing support for a lower thrust bearing assembly 202 that is supported within a bearing retainer or cap element 204 and positioned on one side of a pin 206 extending through a transverse passage 207 formed in the stem drive element 172. An upper thrust bearing assembly 208 is retained within the bearing retainer on the opposite side of the bearing support pin 206. Support rings 209 are positioned on either side of the pin 206 so as to transmit thrust loads to the bearings. The bearing retainer is formed to define an internally threaded portion 210 having threaded engagement with an externally threaded portion 212 of the bonnet structure. A set screw 214 or other suitable locking element may be received by the bearing retainer element and may be brought into locking engagement with the bonnet structure to insure against inadvertent rotation of the bearing retainer relative to the bonnet.

In the event the thrust bearings require servicing or replacement or in the event it is desirable to remove and replace the packing assembly of the valve mechanism, it may be desirable to achieve such repair or replacement without shutting down the flow line controlled by the valve mechanism. In accordance with the present invention, such maintainence operations are readily carried out with the valve under pressure and in service by developing a seal between the stem drive element 172 and the bonnet structure to prevent leakage. This back-face seal, once developed, will insure against leakage along the stem drive element and will allow removal of both the bearing retainer and packing retainer for servicing or replacement. The packing assembly 186 may be removed through utilization of the back-face seal.

Figure 9:
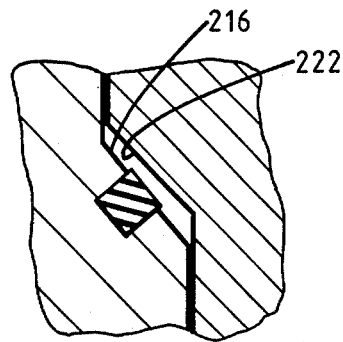
FIG. 9 is a fragmentary sectional view of the upper, bonnet and stem actuation portion of the valve mechanism of FIGS. 1 and 2, illustrating the back seating assembly in detail.
Figure 10:
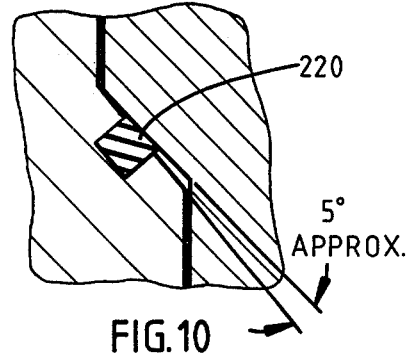
FIG. 10 is a fragmentary sectional view of the back seating system of FIG. 9, illustrating the position of the tapered shoulder and back seating seal surfaces and resilient back seating sealing element prior to sealing engagement therebetween.
Figure 11:
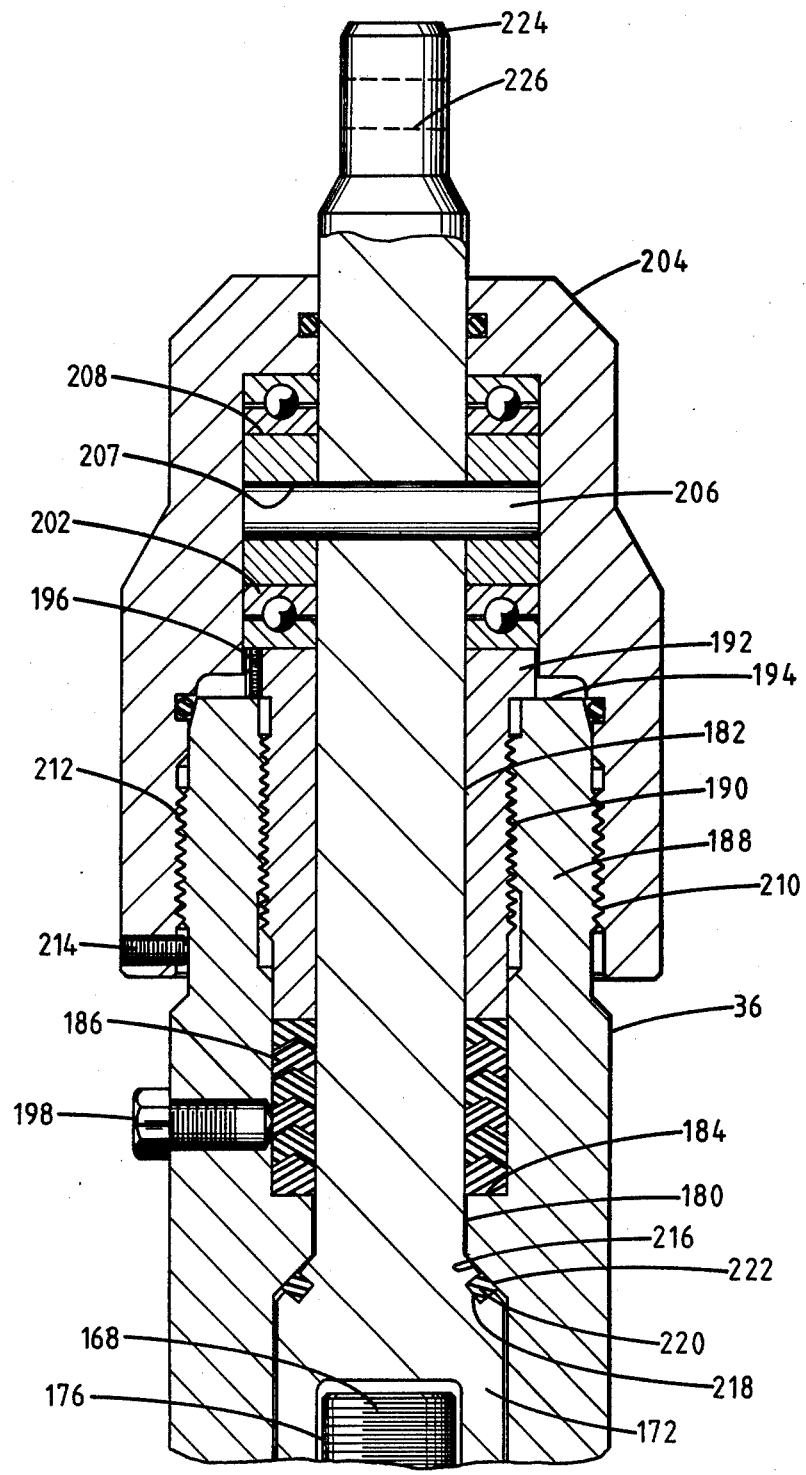
FIG. 11 is a fragmentary sectional view of the back seating seal mechanism with the tapered shoulder and back seating seal surface in engagement and with the sealing element being fully compressed to establish a positive seal.

As is more clearly evident from a review of FIGS. 9, 10 and 11, the stem drive element is formed to define an externally tapered shoulder surface 216 and an annular seal groove 218 is defined within the stem drive element. As annular sealing element 220 of generally rectangular cross-sectional configuration may be positioned within the annular seal groove 218 with a sealing portion thereof extending slightly beyond the annular tapered surface 216. The annular restriction 180 within the valve stem passage of the bonnet may also form an internally tapered back-face seating surface 222 having a slightly different taper as compared to the taper of the annular tapered shoulder 216. As shown in FIGS. 10 and 11, the tapered surfaces 216 and 222 differ by approximately 5°, thereby causing these surfaces to diverge in the upstream direction. The tapered surfaces are so arranged that metal-to-metal sealing contact may be accomplished as shown in FIG. 11 to achieve a small area of mechanical contact that can be established extremely high mechanical pressure, thus insuring a metal-to-metal seal. Because these tapered surfaces diverge, as shown in FIGS. 10 and 11, metal-to-metal contact between the tapered metal surfaces cause the annular sealing element 220 to be compressed between the surfaces. The divergence of the tapered surfaces allows the sealing element 220 to be compressed to a greater degree at the downstream portion thereof, thus allowing the sealing element to become pressure energizable and thus enhancing the sealing ability of the seal 220 in direct response to an increase in pressure upstream of the sealing element.

Under ordinary valve operation, the tapered surfaces 216 and 222 always remain in spaced relation. For example, as shown in FIG. 1, the thrust bearings 202 and 208 through engagement with the stem pin 206 of the stem drive element effectively positions the stem drive element such that the tapered shoulder 216 and the tapered seat surface 222 remain spaced at all times. In the event it is desirable to bring the tapered surfaces and sealing element into back-face sealing relation, it is necessary to unthread the bearing retainer element 204 slightly in the manner illustrated in FIG. 9, thus allowing the annular shoulder 216 to move into metal-to-metal engagement with the tapered annular seat surface 222. After the back-face seal has been developed between the bonnet and the stem drive element in the manner discussed above, the bearing retainer element 204 may be completely unthreaded from the bonnet and removed. The upper thrust bearing 208 may be removed from the valve stem and, after removal of the transverse stem pin 206 from the aperture 207, the lower thrust bearing 202 may be removed in like manner. The packing gland 188 may then be removed by first loosening the set screw 196 and by simply unthreading the packing gland or retainer 188 from the internal threads of the bonnet. After replacement of the packing and packing gland, the lower thrust bearing 202 may be positioned about the upper extremity of the stem drive element 172 and the transverse stem pin 206 may be positioned within the stem opening 207. The upper thrust bearing then may be placed about the upper extremity of the stem drive element and the bearing retainer 204 may be threaded onto the bonnet to bring the internal stop shoulder 201 of the retainer element into seated engagement against the upper surface 200 of the packing gland. Reaction between the thrust bearings and the stem pin 206 will cause unseating of the back-face seal between the tapered surfaces 216 and 222, thus again positioning the bonnet and valve stem structure of the valve mechanism in the operating position thereof.

The upper extremity 224 of the stem drive element may be formed to define a transverse passage 226 for connection with a hand wheel structure for manual valve operation or, in the alternative, any suitable mechanical operator mechanism may be connected to the stem drive element for achieving opening and closing movement of the valve mechanism.

In view of the foregoing, it is clearly apparent that I have provided a novel expanding type gate valve mechanism utilizing a pair of gate segments that are cammed into spreaded sealing engagement with seat assemblies at both the open and closed positions of the valve mechanism. A gate segment spreader and centralizer mechanism is positioned in stationary manner within the valve chamber of the valve and engages cam surfaces defined on each of the gate segments to achieve camming movement of the gate segments in order to enhance the sealing ability of the valve mechanism by mechanical means at both the open and closed positions thereof. The gate spreader and centralizer system achieves centralizing of the gate segments at the open and closed positions thereof and during travel between the open and closed positions. The centralizer and spreader mechanism of the invention also provides a stop to limit gate travel and to insure accurate positionng of the gate segments at the open and closed positions of the valve mechanism.

My invention also incorporates a novel back-face seating system allowing a fluid tight seal to be developed between a stem drive element and the bonnet structure so as to allow repair or replacement of the thrust bearing and packing assembly of the valve mechanism while the valve is maintained in service and under pressure. Back-face seating is accomplished through a novel metal-to-metal sealing arrangement and a compressible seal that is subjected to higher compression at the downstream portion thereof, thus developing a pressure actuatable seal that enhances sealing ability in direct response to the pressure acting upon the seal. It is therefore clearly apparent that this invention is well adapted to attain all of the objects and features hereinabove set forth together with other objects and features that are inherent from a review of the apparatus itself. Accordingly, the present invention is adapted to attain the objects and advantages hereinabove set forth, together with other advantages that are inherent in the apparatus itself. It will be understood that certain combinations and subcombinations are of utility and may be employed without reference to other features and subcombinations. This is contemplated by and is within the spirit and scope of the present invention.

What is claimed is:

1. A gate valve for controlling the flow of fluid, said gate valve comprising:

valve body means being formed to define a valve chamber and inlet and outlet flow passages intersecting said valve chamber;

a pair of valve seats located in opposed relation within said valve chamber and in surrounding relation with respective ones of said flow passages;

a pair of gate segments being movably positioned within said valve chamber and being interposed between said valve seats, each of said gate segments defining sealing surface means in sealing engagement with respective ones of said valve seats, said gate segments defining port means for registry with said flow passages in the open position of said valve and defining blocking means for blocking the flow of fluid through said flow passages in the closed position of said valve;

bonnet means being secured to said valve body and forming a closure for said valve chamber;

actuator means being provided on said bonnet means and being connectable to said gate segments for causing reciprocation of said segments within said valve chamber; and spreader means being positioned within said valve and engaging said gate segments, said spreader means allowing collapsing of said gate segments to facilitate segment travel between the open and closed positions of said valve and causing expansion of said segments in the open and closed positions of said valve to mechanically enhance the sealing ability of said gate valve.

2. A gate valve as recited in claim 1, wherein:
said spreader means is retained in fixed relation within said valve chamber.

3. A gate valve as recited in claim 1, wherein:
said segments each define movable cam surface means;
said spreader means defines stationary cam surface means, said movable cam surface means engages said stationary cam surface means to cause sealing expansion of said gate segments as said segments reach said open and closed positions.

4. A gate valve as recited in claim 1, wherein:
one of said segments defines movable opening cam surface means and the other of said segments defines movable closing cam surface means;
said spreader means defines stationary opening and closing cam surface means for selective engagement with said cam surface means of said segments to cause sealing expansion of said segments as said segments reach said open and closed positions.

5. A gate valve as recited in claim 1, wherein:
said spreader means is capable of being partially compressed under application of high mechanical force thereto, said spreader means partially compressing to allow precise positioning of segments at said open and closed positions.

6. A gate valve as recited in claim 4, wherein:

said spreader means defines a pair of segment engaging cam surfaces, said cam surfaces being compressible toward one another under high mechanical load.

7. A gate valve as recited in claim 1, wherein said spreader means comprises:
a centralizer element being positioned in stationary relation within said valve;
a pair of elongated spreader elements depending from said centralizer element, each of said pair of spreader elements defining a pair of cam surfaces, said cam surfaces of said spreader elements being positioned for selective engagement with cam surfaces of said gate segments.

8. A gate valve as recited in claim 1, wherein:
said valve chamber is of generally circular cross-sectional configuration;
a pair of partially cylindrical seat carrier elements are positioned within said valve chamber and are formed to define annular openings to receive said seats; and
said gate segments and spreader are positioned between said seat carrier elements.

9. A gate valve as recited in claim 8, wherein:
said seat carrier elements are formed to define generally planar gate support surfaces.

10. A gate valve as recited in claim 1, wherein each of said valve seats comprises:
an annular seat ring having sealing face means defined at each extremity thereof;
annular seal grooves being defined at each sealing face means of said valve seat; and
annular seal means being retained within each of said seal grooves, one of said seal means having sealing engagement with one of said gate segments and the other of said seal means having sealing engagement with said valve body.

11. A gate valve as recited in claim 10, wherein:
said valve body is formed to define seat recesses surrounding said flow passages; and
said valve seat being receivable within said seat recesses.

12. A gate valve as recited in claim 1, wherein:
said actuator means includes an elongated gate drive element defining an external annular tapered shoulder, said tapered shoulder being formed to define an annular seal groove;
an annular back-sealing element being located within said seal groove with at least a portion of said sealing element protruding from said seal groove; and
said bonnet means being formed to define an internal annular tapered seat surface, said annular back-sealing element being engagable with said tapered seat surface to develop a seal between said gate drive element and said bonnet.

13. A gate valve as recited in claim 12, wherein:
said tapered shoulder and tapered seat surface are capable of metal-to-metal sealing engagement.

14. A gate valve as recited in claim 12, wherein:
the angles of taper of said tapered shoulder and tapered seat differ, allowing metal-to-metal contact to occur between said tapered shoulder and tapered seat and simultaneously allowing sealing engagement between said annular sealing element and said tapered seat surface.

15. A gate valve as recited in claim 12, wherein:
said annular sealing element is subjected to a higher degree of compression at one portion thereof.

16. A gate valve as recited in claim 12, wherein:
said tapered shoulder and tapered seat surface diverging in an upstream direction; and
said sealing element being subjected to a higher degree of compression at the downstream portion thereof.

* * * * *